United States Patent
Breyer et al.

(10) Patent No.: US 12,281,743 B2
(45) Date of Patent: Apr. 22, 2025

(54) INSULATED SUBASSEMBLY

(71) Applicant: Georg Fischer Rohrleitungssysteme AG, Schaffhausen (CH)

(72) Inventors: Markus Breyer, Radolfzell (DE); Alessandro Anello, Schaffhausen (CH)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 17 days.

(21) Appl. No.: 18/093,389

(22) Filed: Jan. 5, 2023

(65) Prior Publication Data
US 2023/0213138 A1 Jul. 6, 2023

(30) Foreign Application Priority Data
Jan. 6, 2022 (EP) .................................... 22150433

(51) Int. Cl.
*F16L 59/18* (2006.01)
*F16L 37/00* (2006.01)
*F16L 37/12* (2006.01)

(52) U.S. Cl.
CPC ........... *F16L 59/182* (2013.01); *F16L 37/008* (2013.01); *F16L 37/12* (2013.01); *F16L 59/188* (2013.01)

(58) Field of Classification Search
CPC ..... F16L 59/182; F16L 59/188; F16L 59/023; F16L 59/024; F16L 59/103
USPC .......................................................... 285/47
See application file for complete search history.

(56) References Cited

U.S. PATENT DOCUMENTS

| | | | | |
|---|---|---|---|---|
| 926,423 A | * | 6/1909 | Kelly | F16L 9/14 138/140 |
| 1,814,134 A | * | 7/1931 | Eige | F16L 59/16 138/140 |
| 2,784,129 A | * | 3/1957 | Stephens | F16L 59/024 174/DIG. 11 |
| 3,204,668 A | * | 9/1965 | Emerson, Jr. | F16L 59/024 138/158 |
| 3,425,456 A | * | 2/1969 | Schibig | F16L 59/024 174/136 |
| 3,614,967 A | * | 10/1971 | Royston | F16L 59/023 156/304.6 |
| 4,478,252 A | * | 10/1984 | McLoughlin | F16L 47/22 138/140 |
| 4,696,324 A | | 9/1987 | Petronko | |
| 4,830,060 A | * | 5/1989 | Botsolas | F16L 59/161 138/158 |

(Continued)

FOREIGN PATENT DOCUMENTS

| | | |
|---|---|---|
| DE | 3729083 A1 | 4/1988 |
| DE | 3723394 A1 | 2/1989 |

(Continued)

*Primary Examiner* — David Bochna
(74) *Attorney, Agent, or Firm* — Harness, Dickey & Pierce, P.L.C.

(57) ABSTRACT

An insulated subassembly for connecting pipelines, containing two insulating half shells made from an insulating plastics, in each case a housing half shell surrounding an insulating half shell, wherein the housing half shell surrounds the outer peripheral surface of the insulating half shell, and at least one hinge connecting the housing half shells, wherein the insulated subassembly contains at least one coupling, preferably quick couplings, positively surrounded by the insulating half shells, and integral closure elements are arranged on the housing half shells.

11 Claims, 2 Drawing Sheets

(56) References Cited

U.S. PATENT DOCUMENTS

Figure 1:
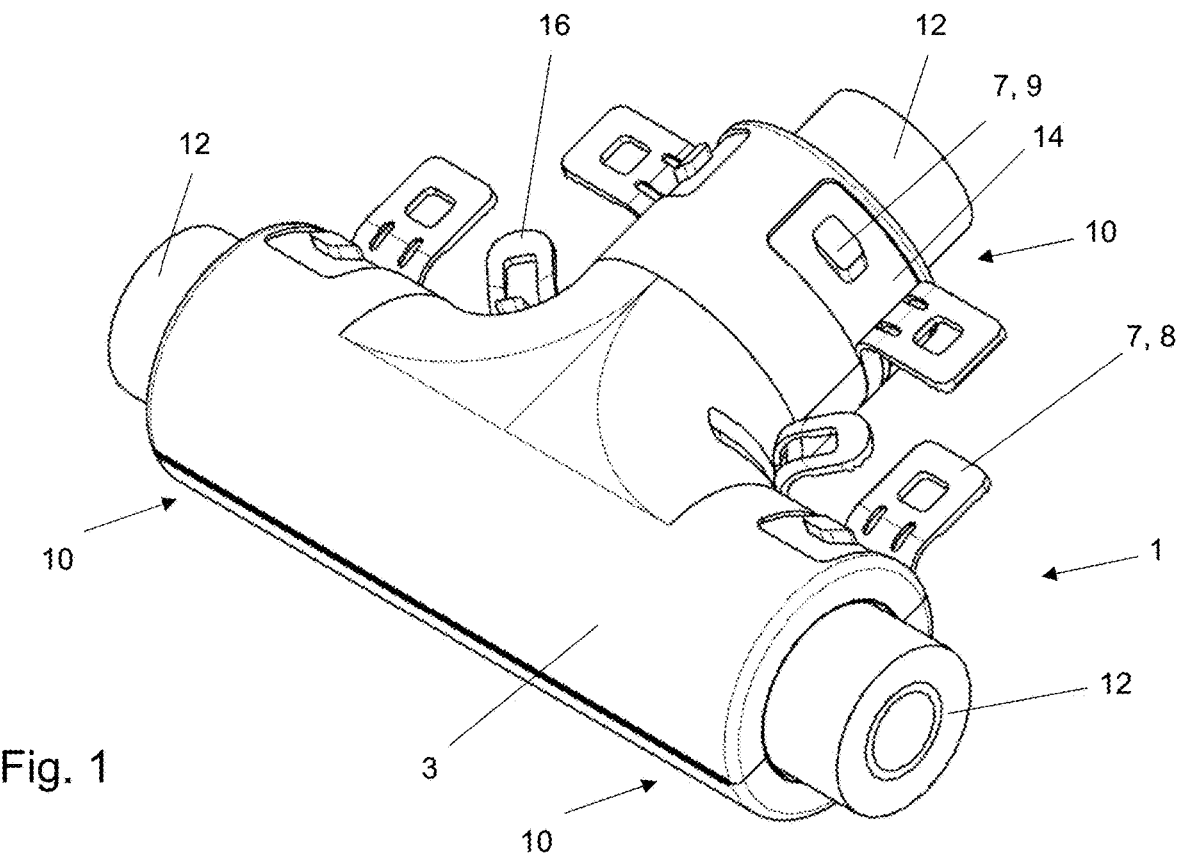

| | | | | | |
|---|---|---|---|---|---|
| 5,002,716 | A | * | 3/1991 | Van Dijck | F16L 59/182 285/47 |
| 5,348,044 | A | * | 9/1994 | Eugene | F16L 59/161 285/55 |
| 5,797,415 | A | | 8/1998 | Nicholson et al. | |
| 5,814,825 | A | * | 9/1998 | Mussman | G21F 3/00 250/519.1 |
| 6,292,627 | B1 | * | 9/2001 | Gilchrist, Jr. | F16L 53/37 392/311 |
| 6,460,576 | B2 | * | 10/2002 | Vitoorapakorn | F16L 59/023 138/156 |
| 11,156,322 | B2 | * | 10/2021 | Vitoorapakorn | F16L 59/023 |
| 2003/0220677 | A1 | * | 11/2003 | Doan | A61N 1/056 607/125 |
| 2018/0209322 | A1 | * | 7/2018 | Zhu | F28F 13/14 |
| 2020/0191317 | A1 | * | 6/2020 | McBride | F16L 59/08 |

FOREIGN PATENT DOCUMENTS

| | | |
|---|---|---|
| EP | 0272363 A2 | 6/1988 |
| EP | 2418744 A1 | 2/2012 |
| FR | 2559874 A1 | 8/1985 |

\* cited by examiner

INSULATED SUBASSEMBLY

CROSS-REFERENCE TO RELATED APPLICATION

This application claims the benefit and priority of European Patent Application No. 22 150 433.5 filed Jan. 6, 2022. The entire disclosure of the above application is incorporated herein by reference.

BACKGROUND OF THE INVENTION

Technical Field

The invention relates to an insulated subassembly for connecting pipelines, containing two insulating half shells made from an insulating plastics, in each case a housing half shell surrounding an insulating half shell, wherein the housing half shell surrounds the outer peripheral surface of the insulating half shell, and at least one hinge connecting the housing half shells.

Discussion

Pre-insulated pipelines are generally used in applications in which an effective insulation of the medium in the pipeline is required relative to the surrounding conditions. For example, such pre-insulated pipelines are used for transporting refrigerant media. Such pre-insulated pipelines can also be used in building technology for the use of air-conditioning systems. Generally an insulating insulation layer is arranged around the pipe transporting the medium, said insulation layer reducing or eliminating the temperature exchange as far as possible. Pipelines which conduct a medium and which are connected by couplings are generally not insulated on the couplings or an insulating material is adhesively bonded thereon which does not ensure an optimal insulation, and the effort required for attaching the insulation is very time-consuming.

DE 37 23 394 A1 discloses an insulating cassette for fittings and flanges in pipelines. A drawback with the described solution is that the cassette halves are configured as two individual parts and in order to be tightly closed also require separate structural elements which readily become forgotten or mislaid.

EP 2 418 744 A1 discloses a sealing device for sealing a connector. The sealing device contains two sealing half shells which are introduced into a foldable housing and this housing is then mounted around the connector in order to seal this connector. However, this device is not suitable for insulating and is used only for sealing.

It is the aspect of the invention to propose an insulated subassembly for connecting pipelines which permits the quick connection of pre-insulated pipelines and which effectively insulates fittings, no separate individual parts being required in order to attach the insulation.

SUMMARY

This aspect is achieved by the insulated subassembly containing at least one coupling, preferably quick couplings, positively surrounded by the insulating half shells, and closure elements being integrally arranged on the housing half shells.

The insulated subassembly according to the preferred embodiment of the invention for connecting pipelines contains two insulating half shells made from an insulating plastics, in each case a housing half shell surrounding an insulating half shell, wherein the housing half shell surrounds the outer peripheral surface of the insulating half shell, and at least one hinge connecting the housing half shells. The housing half shell surrounds the insulating half shell only on the outer face of the insulating half shell which is curved in a concave manner. The housing half shells are connected together in one piece via the hinge and preferably manufactured from the same material. The hinge is preferably integrally arranged between the two housing half shells. Preferably, the two housing half shells and the hinge are configured as an injection-moulded part. It is particularly preferred if the housing half shells, including the hinge, are manufactured by injection-moulding around the two insulating half shells.

Wherein alternatively it is also conceivable that the housing half shells together with the connecting hinge are manufactured separately, preferably as one part, and the hinge is integrally arranged between the two half shells, and then the two insulating half shells are introduced.

The insulated subassembly additionally has at least one coupling, preferably quick couplings, positively surrounded by the insulating half shells and closure elements are integrally arranged on the housing half shells. The quick coupling which is preferably used is characterized in that the pipe end is fixed simply by being inserted as far as a stop in the quick coupling.

It is advantageous if the closure elements are arranged in one piece on the housing half shells and are made from the same material. The closure elements are preferably directly injection-moulded integrally on the housing half shells during the injection-moulding thereof.

As a result, the insulated subassembly has no further separate structural elements or components but consists exclusively of the insulated subassembly and is able to be used and applied without further components or structural elements. As a result, no structural elements can become mislaid or forgotten during assembly.

It has been shown as a preferred embodiment if the closure elements in each case have at least one closure tab and one closure hook, wherein the closure tab is hooked into the closure hook for closing the insulated subassembly. It has been shown as advantageous if in each case the closure tabs are integrally arranged on the one housing half shell and the closure hooks are integrally arranged on the opposing housing half shell.

Preferably, the closure tab is configured to be resilient, whereby the closure tabs can be clamped, and tightly closes the insulated subassembly due to the pretensioning of the closure tabs which has been achieved.

It has been shown to be advantageous if the closure elements are arranged in each case at the end or on the outer region of each connecting piece. As a result, the insulated subassembly is correctly closed and does not spring open at the ends. It has also been shown to be advantageous if a closure tab is arranged in the branching or in the curved portion.

It has been shown to be advantageous if the closure tab bears at least partially around the periphery of the connecting piece of the opposing housing half shell. As a result, the connecting pieces are at least partially encircled by the closure tab.

Preferably, tab recesses are provided on the opposing housing half shell, the closure tabs being positively received thereby. Preferably, the outer surface of the closure tabs terminates flush with the outer surface of the housing half shell. As a result, the closure tab does not protrude in any manner, whereby an inadvertent release of a closure tab can be avoided.

It has been shown as a further preferred embodiment if a receiving ring is arranged in each case in the connecting pieces for encompassing the connected insulated pipeline. The receiving ring serves for an accurate shaping of the pre-insulated pipeline since this pipeline is subject to very high tolerances and by means of the receiving ring the pipeline achieves an accurately defined periphery which is positively encompassed by the two insulating half shells. To this end, the insulating half shell preferably has a concave recess which corresponds to the shape of the receiving ring and in which the receiving ring is arranged.

A preferred embodiment is that the insulated subassembly is configured as a T-piece, angled piece, sleeve or similar shaped pieces. It is also advantageous if the number of couplings, preferably quick couplings, arranged in the insulated subassembly is analogous to the number of connecting pieces. In other words, three couplings, preferably quick couplings, are present in a T-piece and two couplings, preferably quick couplings, are present in an angled piece in the insulated subassembly.

Preferably, the insulating half shells are manufactured from one of the plastics PUR (polyurethane), EPP (expanded polypropylene) or XPE (chemically crosslinked polyethylene), wherein the plastics are preferably configured as foam.

It has been shown as an advantageous embodiment if the housing half shells are manufactured from TPE (thermoplastic elastomers).

It has been shown as a preferred embodiment if the insulating half shells have sealing and positioning elements which can be mutually inserted into one another in order to be accurately positioned relative to one another and also seal the insulated subassembly. Preferably, to this end the one insulated subassembly has a tongue and groove connection, said tongue and groove connections interlocking when the half shells are folded up. Preferably, these tongue and groove connections are arranged along the edges of the insulating half shells which come to bear against one another when the two half shells are folded up.

DRAWINGS

All possible embodiments can be freely combined together.

Figure 2:
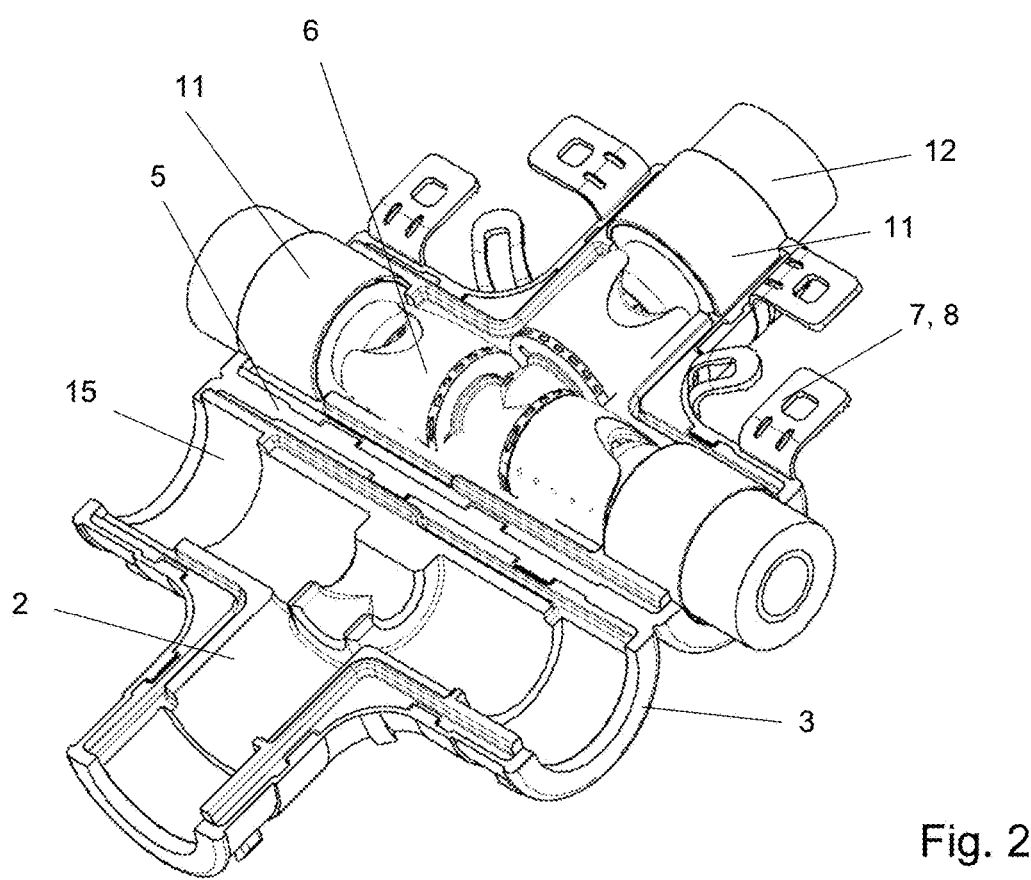
Figure 3:
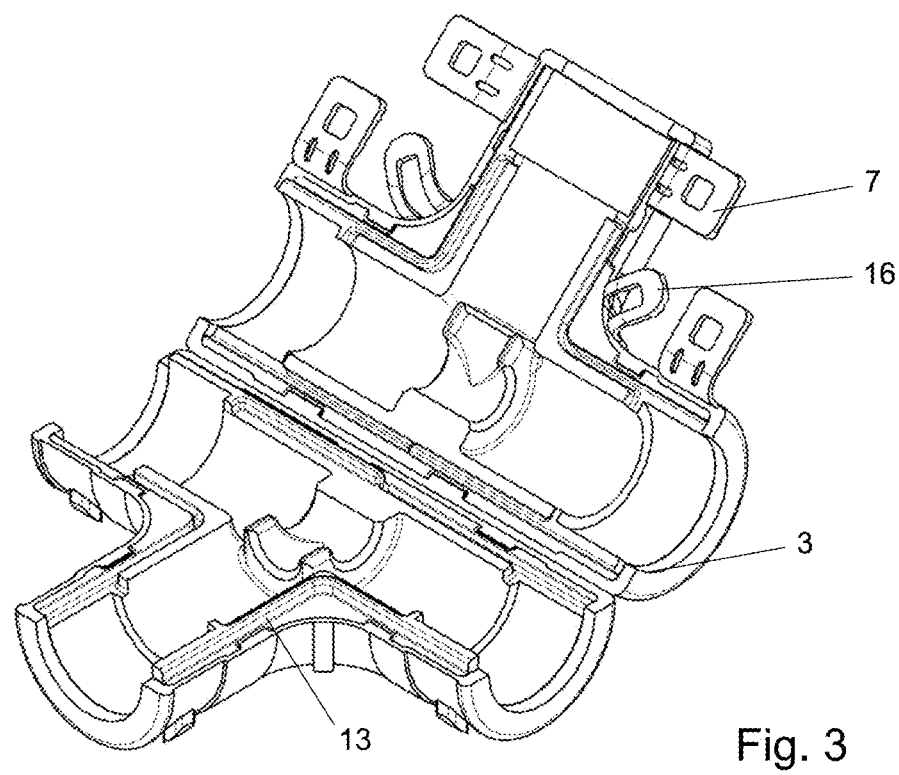
Figure 4:
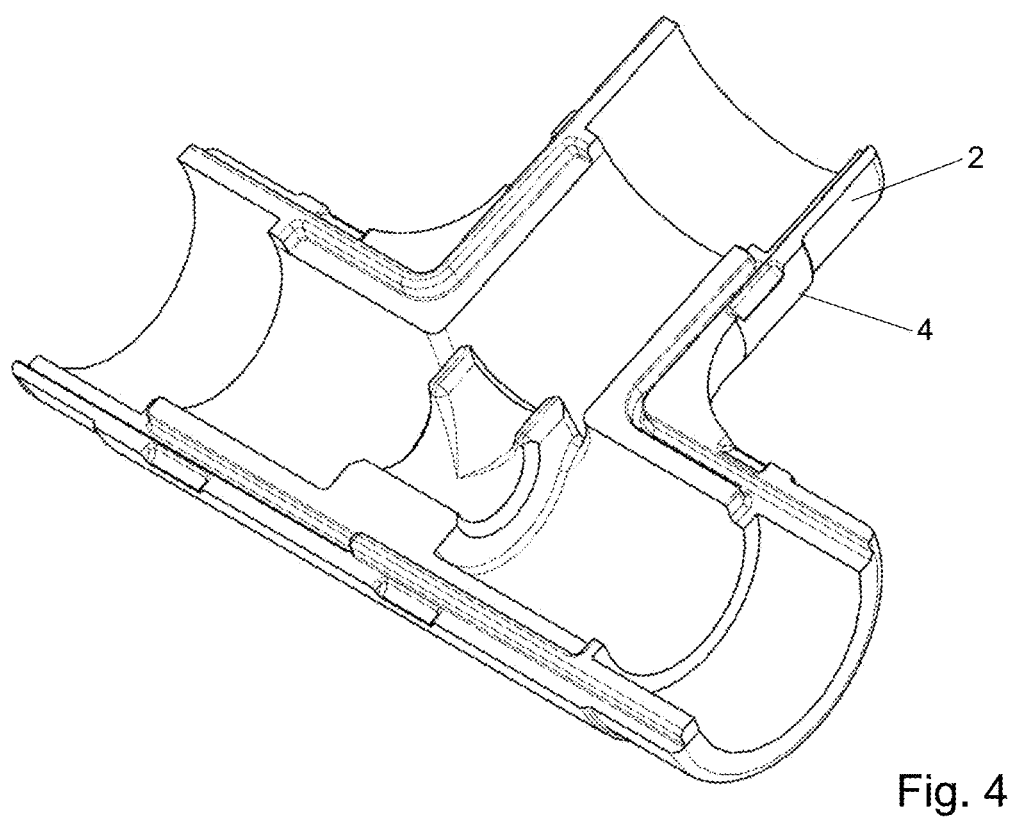

An exemplary embodiment of the invention is described with reference to the figures, wherein the invention is not only limited to the exemplary embodiment. In the figures:

FIG. 1 shows a three-dimensional view of a closed insulated subassembly according to the invention, FIG. 2 shows a three-dimensional view of an open insulated subassembly according to the invention, FIG. 3 shows a three-dimensional view of an open insulated subassembly according to the invention without couplings and FIG. 4 shows a three-dimensional view of a separate insulating half shell.

DESCRIPTION OF THE PREFERRED EMBODIMENTS OF THE INVENTION

The drawing shown in FIG. 1 shows a three-dimensional view of an insulated subassembly 1 according to the invention in which the two half shells are folded up but the closure tabs 8 of the closure elements 7 are not yet hooked into the closure hooks 9. The closure tabs 8 are designed to be resilient and are directly injection-moulded integrally with the one housing half shell 3, and then hooked into the closure hooks 9 of the opposing housing half shell 3. As the closure hooks are configured to be resilient, a pretensioning is achieved when said closure tabs are hooked into the hooks 9, and to this end it is advantageous if the closure hooks have an inclination, i.e. extend in an obliquely cylindrical manner. It is also advantageous if the closure elements 7 are arranged at the end of the connecting pieces 10. As a result, it is ensured that the insulated subassembly 1 does not spring open at the very end but the half shells bear fixedly against one another. It has also been shown to be advantageous if a further closure element 16 is arranged in the branching or in the curved portion, in the bent portion, which ensures that the half shells also bear correctly against one another here. As is clearly visible in FIG. 1, it is advantageous if the tab recesses 14 are arranged around the closure hooks 9, the closure tabs 8 being arranged so as to be recessed therein when an insulated subassembly 1 is closed, so that nothing protrudes, which could lead to the subassembly 1 inadvertently opening. The depth of the tab recess 14 corresponds to the thickness of the closure tabs 8. The closure tabs 8 extend at least partially along the periphery of the opposing housing half shell 3. FIG. 2 shows the insulated subassembly 1 according to the invention when it is still open. Clearly visible are the quick couplings 6 which are preferably arranged therein, preferably one for each connecting piece 10. A T-piece is shown, wherein an angled piece or other shaped pieces are also conceivable. The insulated subassembly 1 contains two insulating half shells 2 which oppose one another and which are manufactured from an insulating plastics, preferably PUR, EPP or XPE. The subassembly 1 also contains in each case a housing half shell 3 which in each case surrounds the outer peripheral surface 4 of the insulating half shell 2. A connecting hinge 5 is arranged between the housing half shells 3, wherein the hinge 5 is integrally arranged on the two housing half shells 3, preferably to this end a hinge 5 being integrally injection-moulded therewith at the same time and being encapsulated by injection-moulding integrally therewith from the same material or when the housing half shells 3 are injection-moulded. Moreover, the housing half shells 3 have integrally arranged closure elements 7. The closure elements 7 are preferably formed by closure tabs 8 and closure hooks 9, wherein the one is arranged on the one housing half shell 3 and the other is arranged on the other housing half shell 3. It is advantageous if the connected insulated pipelines 12 are surrounded by a receiving ring 11. This is because generally the pre-insulated pipelines 12 which have to be connected to the subassembly 1 have high tolerances in their dimensions, whereby it is not possible to ensure that the subassembly 1 optimally encompasses the pipeline 12. The pipeline 12 is pressed into a predetermined shape by the receiving ring 11 and thus is always the same. Preferably, to this end the insulating half shell 2 has a corresponding negative shape which is configured as a concave recess 15 in which the receiving ring 11 is positively arranged.

FIG. 3 shows the half shells 2, 3 in the slightly open state without the inserted quick couplings 6. Clearly visible are the two insulating half shells 2, the sealing and positioning elements 13 being arranged thereon, so that when the subassembly 1 is closed the half shells are precisely oriented relative to one another and also can no longer be mutually displaced. The sealing and positioning elements 13 are preferably configured as a tongue and groove connection and are arranged in the insulating half shells 2. FIG. 4 shows a separate insulating half shell 2 which is not yet encompassed by the housing half shell 3.

What is claimed is:

1. An insulated subassembly for connecting pipes in a pipeline, comprising two insulating half shells made from an insulating plastics, a housing half shell surrounding each insulating half shell, wherein the housing half shell surrounds the outer peripheral surface of the insulating half shell, and at least one hinge connecting the housing half shells, wherein the insulated subassembly contains at least one coupling positively surrounded by the insulating half shells, integral closure elements arranged as pairs on the housing half shells, wherein one of the pair of closure elements is configured as a closure tab resiliently connected to an edge of one half shell and another of the pair of closure elements is a closure hook on a surface of the other half shell, wherein the closure tab is hooked into the closure hook for closing the insulated subassembly, the insulating half shells and the housing half shells being configured to provide a plurality of connecting pieces each receiving a pipe, wherein a receiving ring is arranged in the connecting pieces for encompassing the pipes; and wherein the surface of the half shell containing the closure hook is provided with a recess surrounding the closure hook, with the recess receiving the closure tab.

2. An insulated subassembly according to claim 1, wherein the closure elements are arranged in one piece on the housing half shells and are made from the same material.

3. An insulated subassembly according to claim 1, wherein the closure tabs are configured to be resilient.

4. An insulated subassembly according to claim 1, wherein the closure elements are arranged in each case at the end of each connecting piece of the insulated subassembly.

5. An insulated subassembly according to claim 1, wherein the closure tab bears at least partially around the periphery of the connecting piece of the opposing housing half shell.

6. An insulated subassembly according to claim 1, wherein the insulated subassembly is configured as a T-piece or angled piece, sleeve or similar shaped pieces.

7. An insulated subassembly according to claim 1, wherein the insulating half shells are manufactured from one of the plastics PUR, EPP or XPE.

8. An insulated subassembly according to claim 1, wherein the housing half shells are made from TPE.

9. An insulated subassembly according to claim 1, wherein the hinge is integrally formed between the two housing half shells.

10. An insulated subassembly according to claim 1, wherein the insulating half shells have sealing and positioning elements which can be mutually inserted into one another in order to be accurately positioned relative to one another.

11. An insulated subassembly according to claim 1, wherein the half shells have concave recesses for receiving the ring.

* * * * *